US 8,498,297 B2

(12) United States Patent
Bragg et al.

(10) Patent No.: US 8,498,297 B2
(45) Date of Patent: Jul. 30, 2013

(54) FORWARDING TABLE MINIMISATION IN ETHERNET SWITCHES

(75) Inventors: Nigel Bragg, Weston Colville (GB);
Michael Chen, Chapel Hill, NC (US);
John Osswald, Northbridge, MA (US);
Mirza Arifovic, Andover, MA (US)

(73) Assignee: Rockstar Consortium US LP, Plano, TX (US)

( * ) Notice: Subject to any disclaimer, the term of this patent is extended or adjusted under 35 U.S.C. 154(b) by 749 days.

(21) Appl. No.: 11/223,246

(22) Filed: Aug. 26, 2005

(65) Prior Publication Data

US 2007/0047540 A1 Mar. 1, 2007

(51) Int. Cl.
*H04L 12/28* (2006.01)
*H04L 12/56* (2011.01)

(52) U.S. Cl.
USPC ..................... 370/395.53; 370/386

(58) Field of Classification Search
USPC ............... 370/386, 396, 398, 396.53, 432
See application file for complete search history.

(56) References Cited

U.S. PATENT DOCUMENTS

| | | | |
|---|---|---|---|
| 5,560,038 A | 9/1996 | Haddock | |
| 5,649,108 A * | 7/1997 | Spiegel et al. | 709/241 |
| 5,764,636 A * | 6/1998 | Edsall | 370/401 |
| 5,959,990 A | 9/1999 | Frantz | |
| 6,118,760 A * | 9/2000 | Zaumen et al. | 370/229 |
| 6,181,699 B1 | 1/2001 | Crinion | |
| 6,249,521 B1 | 6/2001 | Kerstein | |
| 6,515,993 B1 | 2/2003 | Williams | |
| 6,563,832 B1 | 5/2003 | Stuart | |
| 6,990,106 B2 | 1/2006 | Bhatia | |
| 7,046,680 B1 | 5/2006 | McDysan | |
| 7,079,544 B2 | 7/2006 | Wakayama | |
| 7,149,214 B2 * | 12/2006 | Wu et al. | 370/389 |
| 7,492,768 B2 | 2/2009 | Yoon | |

(Continued)

FOREIGN PATENT DOCUMENTS

| | | |
|---|---|---|
| EP | 0993156 | 4/2000 |
| EP | 1158724 | 11/2001 |
| WO | WO 2005/099183 | 10/2005 |

OTHER PUBLICATIONS

U.S. Appl. No. 10/818,685, Office Action dated Aug. 26, 2008, pp. 1-24 and attachments.

(Continued)

*Primary Examiner* — Jae Y Lee
(74) *Attorney, Agent, or Firm* — Pearne & Gordon LLP (57) ABSTRACT

An Ethernet switch for use in an Ethernet network comprises a set of ingress ports for receiving data frames and a set of egress ports. A memory is associated with each ingress port and stores forwarding information indicating one or more of the egress ports to which data frames received by that ingress port should be forwarded. A control or management interface receives information about a network connection established, or to be established, through the switch. A switch controller causes forwarding information to be stored in a memory associated with a first ingress port which the network connection will use, on the basis of the received information about a network connection. Forwarding information is not stored in a memory associated with a second of the set of ingress ports which the network connection will not use. Preferably, the switch controller causes forwarding information to be stored only in a memory associated with the first ingress port which the network connection will use and not to be stored in a memory associated with any of the other ingress ports.

13 Claims, 5 Drawing Sheets

U.S. PATENT DOCUMENTS

| | | | |
|---|---|---|---|
| 2001/0049739 A1* | 12/2001 | Wakayama et al. | 709/230 |
| 2003/0037163 A1* | 2/2003 | Kitada et al. | 709/236 |
| 2003/0055959 A1* | 3/2003 | Sato | 709/224 |
| 2003/0067928 A1 | 4/2003 | Gonda | |
| 2003/0142674 A1 | 7/2003 | Casey | |
| 2003/0152075 A1 | 8/2003 | Hawthorne, III | |
| 2003/0179755 A1* | 9/2003 | Fraser | 370/395.42 |
| 2003/0208632 A1* | 11/2003 | Rimmer | 709/250 |
| 2003/0214962 A1 | 11/2003 | Allaye-Chan | |
| 2004/0223501 A1 | 11/2004 | Mackiewich | |
| 2005/0013297 A1* | 1/2005 | Eriksson | 370/392 |
| 2005/0111434 A1* | 5/2005 | Halen | 370/351 |
| 2005/0141517 A1 | 6/2005 | Choi et al. | |
| 2005/0220096 A1 | 10/2005 | Friskney | |
| 2008/0049621 A1* | 2/2008 | McGuire et al. | 370/236.2 |

OTHER PUBLICATIONS

U.S. Appl. No. 10/818,685, Office Action dated Apr. 11, 2008, pp. 1-23 and attachments.

U.S. Appl. No. 10/818,685, Office Action dated Sep. 19, 2007, pp. 1-19 and attachments.

U.S. Appl. No. 10/818,685, Final Rejection dated Jun. 10, 2009 and attachment (pp. 1-7).

Kawakami et al., Method to Set Up LSP using VLAN Tag Switching, Jun. 2003 (17 pages).

* cited by examiner

FORWARDING TABLE MINIMISATION IN ETHERNET SWITCHES

FIELD OF THE INVENTION

This invention relates to Ethernet switches and to a method of operating such a switch.

BACKGROUND TO THE INVENTION

For many years now, telecommunications carriers have been deploying packet-switched networks in place of, or overlaid upon, circuit-switched networks for reasons of efficiency and economy. Packet-switched networks such as Internet Protocol (IP) or Ethernet networks are intrinsically connectionless in nature and, as a result, suffer from Quality of Service (QoS) problems. Customers value services which are guaranteed in terms of bandwidth and QoS.

It is desired to use Ethernet switches in carriers' networks. Use of Ethernet switches in carriers' networks would have the advantages of interoperability, since mappings between Ethernet and other frame/packet/cell data structures such as IP, Frame Relay are well known, and economy, since Ethernet switches are relatively inexpensive compared to IP routers, for example. It would also provide a distinct advantage of being the principal technology used by enterprises that require a wide area network service from a carrier and therefore able to work in a native mode.

A conventional high-capacity Ethernet switch has a set of input ports and a set of output ports which are connected via a switch fabric. On start-up, or on re-start, a conventional switched Ethernet network behaves like a 'classic' Ethernet Local Area Network (LAN) in that every Ethernet frame is broadcast across the entire network. Every switch, upon receiving an Ethernet frame on one port, broadcasts the frame out on every other port. The process repeats as the frame is received by other switches, thus broadcasting the frame across the entire network. In switched Ethernet networks Medium Access Control (MAC) address auto-learning functionality is provided to improve configuration efficiency. Ethernet frames have source and destination MAC addresses corresponding to their source and destination Ethernet ports. When an Ethernet frame sent out by a source switch is received by an intermediate or destination Ethernet switch the receiving switch observes the port on which the frame was received and the source address of the frame. The switch then builds a forwarding table for use in future frame switching. Once a MAC address has been seen on a port, that information is made available to all ports to be used if any encounters that address. A central processor builds a single Forwarding Database (FDB) on the basis of MAC addresses seen on all ports. Over time, the network builds up forwarding state enabling efficient switching of Ethernet frames, without relying on broadcast any further. On modern high-performance switches the FDB is typically replicated into a memory located at each input port, and the copy of the FDB associated with each port is the same. This allows each port to route a received frame without waiting to access a shared Forwarding Database. The overall memory requirement becomes significant in situations where the switch has a large number of input and output ports and a large FDB.

Conventional Ethernet networks are connectionless, i.e. no path through the network is pre-established for a frame, or group of frames, corresponding to a traffic flow. Patent Application PCT/GB2005/001332, filed 6 Apr. 2005, describes a way of providing connection-oriented behaviour in Ethernet networks. Connections are provided across an Ethernet network by configuring, via a control plane or management interface, Ethernet switches to map received data frames to particular output ports.

SUMMARY OF THE INVENTION

An Ethernet switch for use in an Ethernet network comprises a set of ingress ports for receiving data frames and a set of egress ports. A memory is associated with each ingress port and stores forwarding information indicating one or more of the egress ports to which data frames received by that ingress port should be forwarded. A control or management interface receives information about a network connection established, or to be established, through the switch. A switch controller causes forwarding information to be stored in a memory associated with a first ingress port which the network connection will use, on the basis of the received information about a network connection. Forwarding information is not stored in a memory associated with a second of the set of ingress ports which the network connection will not use. Preferably, the switch controller causes forwarding information to be stored only in a memory associated with the one or more ingress ports which the network connection will use and not to be stored in a memory associated with any of the other ingress ports. When traffic diverges (splits) at the Ethernet switch, forwarding information will cause a data frame arriving at an ingress port to be forwarded to multiple egress ports. When traffic routes converge at the Ethernet switch, forwarding information will be stored at each of the multiple ingress ports where data frames of those routes will arrive, and the forwarding information will cause the data frames to be forwarded to a common egress port.

A consequence of using Ethernet switches in a connection-oriented mode of operation is that frames associated with a particular routing across the network will leave a switch by a known port and can only arrive at the switch through a known port (or set of ports). The Forwarding Database (FDB) associated with each ingress port may therefore be individually populated, and contain only those entries which the Network Management System knows could be validly received on that port. This allows a considerable reduction in FDB memory compared to replicating the FDB table to all ports in the manner of a conventional Ethernet switch, which allows a considerable cost saving. Alternatively, the network can be scaled for a given memory size. Investigation of typical carrier deployment scenarios shows that the reduction in memory size can easily be a factor of four.

Although the ingress and egress ports have been separately referred to it will be understood that typically an Ethernet switch comprises a set of bi-directional interface ports, each bi-directional interface port comprising an ingress port and an egress port. The switch fabric selectively interconnects the ingress port of one bi-directional interface port with the egress port of another bi-directional interface port. Normally the ingress port and egress port of a bi-directional interface port will share a common MAC address.

A further aspect of the invention provides a port card comprising an ingress port for receiving data frames and a memory for storing forwarding information indicating one or more egress ports of the switch to which data frames received by the ingress port should be forwarded. The forwarding information stored in the memory relates only to network connections which use that ingress port. The port card typically supports a bi-directional port having an ingress port function and an egress port function. The port card may house a single ingress port (or bi-directional port) or multiple ports (or bi-directional ports). The plurality of ingress ports may share the same memory.

A further aspect of the invention provides a port controller comprising control logic which is operable to receive forwarding information from the switch controller for a network connection which is established, or will be established, via the ingress port and update the forwarding information in the memory for that ingress port. The forwarding information is received on the basis of whether the network connection will use that ingress port.

A still further aspect of the invention provides a switch controller comprising control logic which is operable to receive information about a network connection established, or to be established, through the switch; and cause forwarding information to be stored in a memory associated with a first ingress port which the network connection will use, on the basis of the received information about a network connection, and not to be stored in a memory associated with a second ingress port which the network connection will not use.

This functionality can be implemented in software, hardware or a combination of these. The invention can be implemented by means of hardware comprising several distinct elements, and by means of a suitably programmed computer. Accordingly, another aspect of the invention provides software for providing the functions of the switch controller and/or port controller. The software may be stored on an electronic memory device, hard disk, optical disk or other machine-readable storage medium. The software may be delivered as a computer program product on a machine-readable carrier or it may be downloaded directly to the switch via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
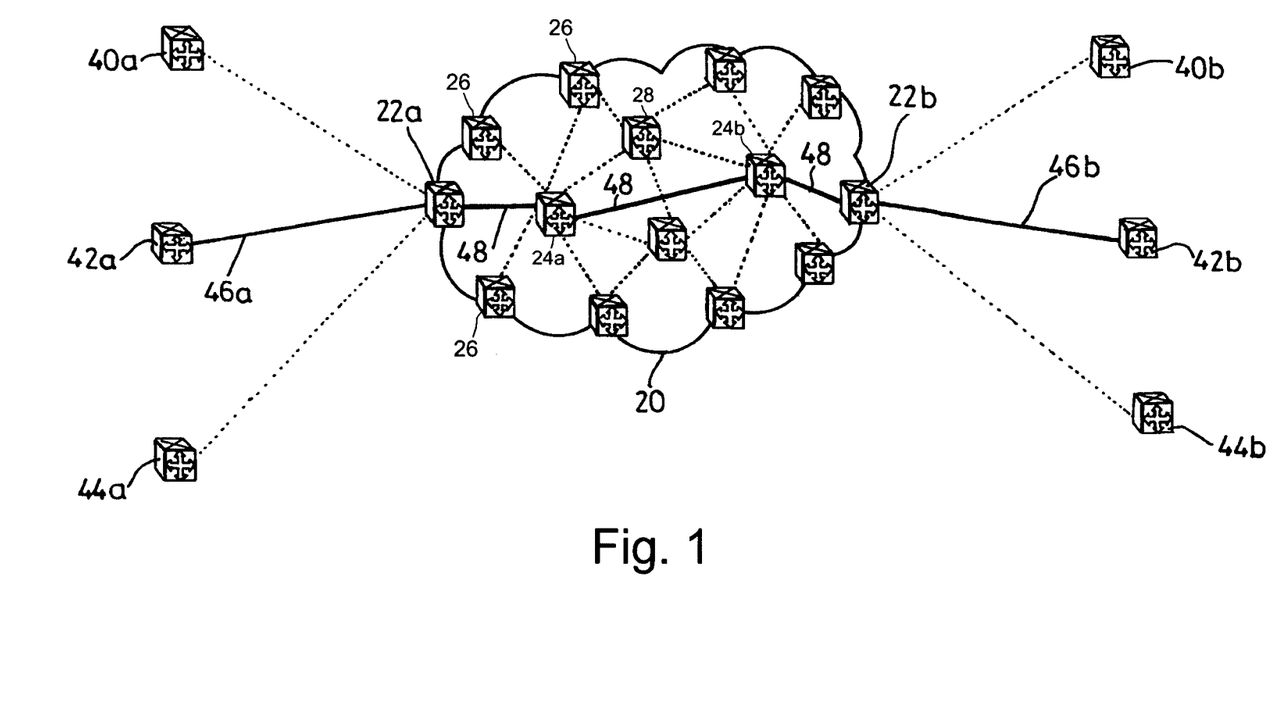
FIG. 1 shows an arrangement of Ethernet switches forming a carrier network and a connection across the carrier network.
Figure 2:
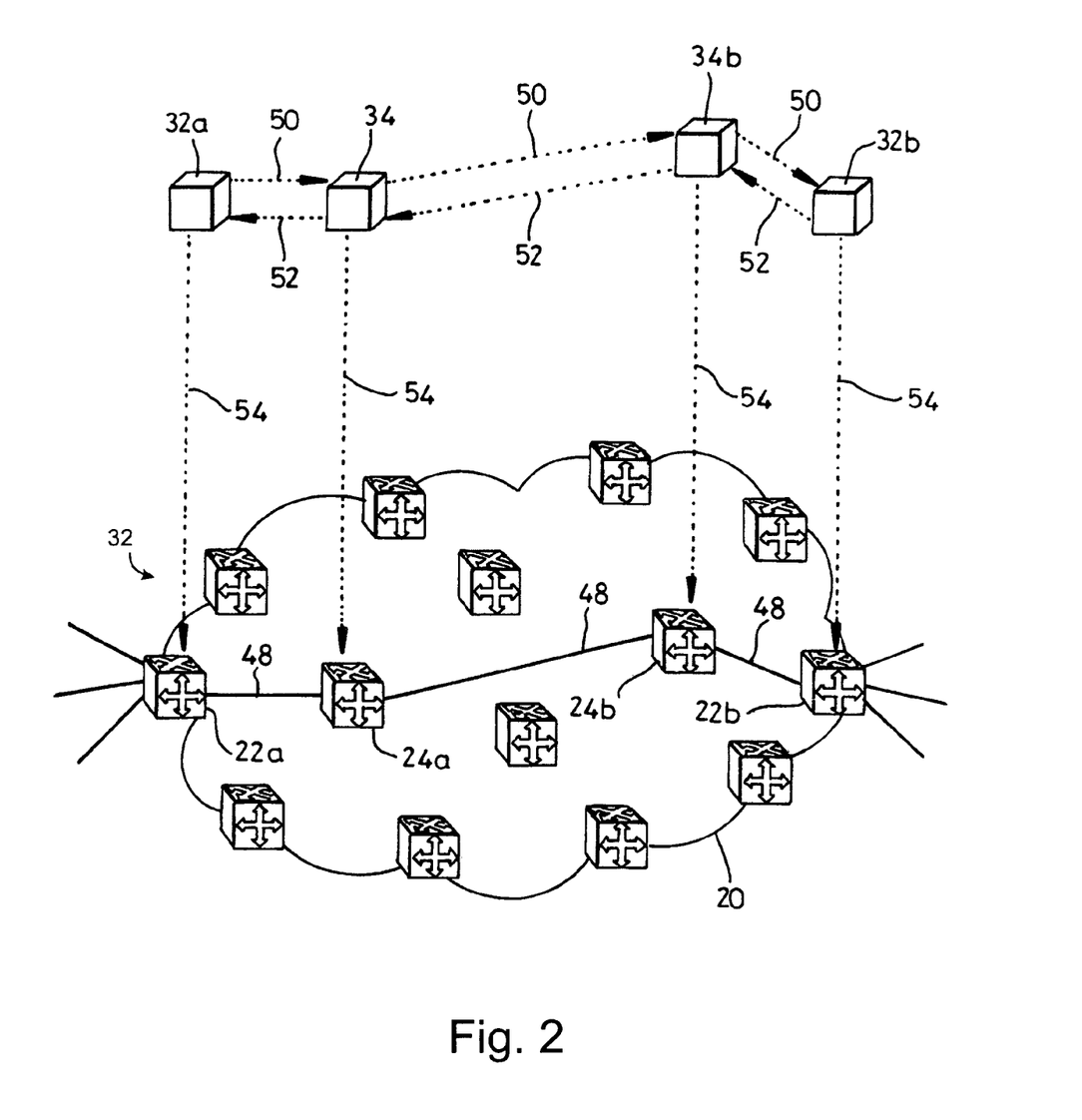
FIG. 2 shows how nodes of the control plane interact with Ethernet switches of the transport plane to establish the connection shown in FIG. 1.

FIGS. 1 and 2 show an arrangement of Ethernet switches and communications links forming a carrier network. Carrier network cloud 20 comprises Ethernet switches 22a, 22b, 24a, 24b, 26 and 28. Ethernet switches 22a, 22b and 26 are located at the edges of carrier network 20, whereas Ethernet switches 24a, 24b, and 28 are located in the core network. Communications links (shown as straight lines) are provided between Ethernet switches 22a, 22b, 24a, 24b, 26 and 28. These communications links may be for example relatively long distance links over optical equipment such as SONET/SDH equipment with Ethernet interfaces using Generic Framing Procedure (GFP) (ITU-T Recommendation G.7041/Y.1303). Although a carrier network is shown as an example of the type of network that the Ethernet switches can be used with, the invention is not limited to this. In addition, although core network switches 24a, 24b, and 28 are shown with a fully-meshed configuration, i.e. there is a direct communications link connecting each core network switch 24a, 24b, and 28 to each other, this is not essential.

The carrier Ethernet network 20 provides connectivity between customer sites. Three customers having respective pairs of geographically distant Ethernet switches (40a and 40b, 42a and 42b, 44a and 44b) are shown connected to carrier network 20 via edge Ethernet switches 22a and 22b respectively. The communications links between edge switches 22a and 22b and customer switches 40a, 40b, 42a, 42b, 44a, and 44b may be dedicated links such as T1, E1 leased lines or access links such as digital Subscriber Lines (DSLs). Carrier edge switches 22a, 22b, 26 may be logically separated into a single Provider Edge- (PE-) Core and one or more PE-Edge functions. The PE-Edge is the ingress/egress point at which customer traffic enters or leaves the carrier network 20. The PE-Core preferentially encapsulates incoming Ethernet traffic from the customer using Media Access Control (MAC) in MAC encapsulation (or, if desired, Pseudo-Wire over MAC encapsulation) and forwards the encapsulated traffic across the carrier network 20. This embodiment is preferred as a mechanism to limit the number of table entries required because only the MAC address space of the carrier network need be recognised, and not the whole of the customer's MAC address space, which could be changed independently. Similarly, the PE-Core decapsulates (strips) outgoing Ethernet traffic and forwards the stripped traffic on to the customer via the appropriate PE-Edge. VLAN tags are often used to provide customer separation at the logical PE-Core with each different customer site connected to each edge switch having a unique VLAN tag. Stacked VLAN (i.e. VLAN-in-VLAN encapsulation or Q-in-Q) may be used to protect any VLAN tags used by the customer traffic. For example, customer switch 42a may send Ethernet traffic over communications link 46a to the logical PE-Edge of edge switch 22a. Logical PE-Core of edge switch 22a encapsulates each Ethernet frame in a further Ethernet frame using the MAC address of the ingress port on edge switch 22a as the source address and the MAC address of the appropriate egress point—in this case a port on edge switch 22b—as the destination address. The encapsulated traffic is forwarded across a connection established over communications links 48 of carrier network 20 to edge switch 22b. Connections may be typically trunked in the sense that traffic from multiple customers will be routed through the same connection. Alternatively, those skilled in the art will appreciate that separate connections 48 could be used for each customer. At the PE-Core of edge switch 22b, the original frames are stripped of their encapsulation and sent over communications link 46b via PE-Edge of edge switch 22b to customer switch 42b.

The logical PE-Edge may also be physically separated from the logical PE-Core and may reside at customer premises whereas the PE-Core would preferentially reside at a central office or Point of Presence (PoP) of the carrier. The reader will also appreciate that other edge switches may also have connections to customer sites and that customers may have to be provided with connectivity between two or more geographically distant sites over carrier network 20.

It will now be described how carrier network 20 is arranged to establish connections through which to forward encapsulated Ethernet traffic. A connection may be defined as an entity configured in a network which provides transport of data from a source node to one or more sink nodes. As described above, carrier network 20 may be at least partially-meshed—i.e. there will usually be more than one possible path between at least some, and preferably all, nodes of the network. Thus, as will be explained below, broadcast and Ethernet MAC address auto learning functionality should be at least partially deactivated to permit loops to be formed safely in the network. On start-up (or on re-start), conventional switched Ethernet networks behave like a "classic" Ethernet Local Area Networks (LANs) in that every Ethernet frame is broadcast across the entire network. Thus, every switch, receiving an Ethernet frame on one port, broadcasts the frame out on every other port. The process repeats as the frame is received by other switches thus broadcasting the frame across the entire network.

MAC address auto-learning functionality is provided to improve configuration efficiency in switched Ethernet networks. Ethernet frames have source and destination MAC addresses corresponding to their source and destination Ethernet ports. (An Ethernet port here is signifying an end system which is therefore configured with at least one MAC address.) When an Ethernet frame sent out by a source switch is received by an intermediate or destination Ethernet switch, the receiving switch observes the port on which the frame was received and the source address of the frame. It then builds up a forwarding table for use in future frame switching. The forwarding table maps destination address to output port and is built up using the source address of a received frame and the input port on which it was received. Over time, the network builds up forwarding state enabling efficient switching of Ethernet frames, without relying on broadcast any further. It can thus be seen that conventional switched Ethernet networks using auto-learning must be simply-connected—i.e. there must be one and only one path between each and every node of the network. If there were multiple paths between any two nodes, the input port on which a frame is received from a source node would not be a reliable indicator of the correct output port to forward future traffic destined for that node. Inconsistencies in forwarding tables on Ethernet switches could result in looping of frames. Moreover, if there exists any loop in a part of the network then any broadcast packet will be continuously duplicated in that loop and the duplicates forwarded all over the whole network, limited only by the link capacities concerned. This inevitably results in catastrophic failure of the network.

In a connection-oriented Ethernet network Ethernet switches do not use auto learning to independently configure their forwarding tables but, instead, forwarding tables are directly configured using an Ethernet control plane. In one possible embodiment this control plane may actually be a centralized Network Management system, with complete knowledge of the state of the entire network. In another embodiment, the control plane may be a distributed function. The configuration of such an Ethernet network will now be described with reference to the latter. FIG. 2 shows elements 32*a*, 34, 34*b*, 32*b* of a control plane/transport plane architecture for controlling the Ethernet carrier network of FIG. 1. The ITU-T Automatically Switched Transport Network (ASTN), sometimes known as the Automatically Switched Optical Network (ASON), may be used as the control plane. The general architectural specification of the ASTN is set out in ITU-T Recommendation G.8080. Control plane 30 comprises a number of connection controllers 32*a*, 32*b*, 34*a*, 34*b*, 36 and 38 corresponding to each of Ethernet switches 22*a*, 22*b*, 24*a*, 24*b*, 26 and 28 of carrier network 20. Control Plane 30 may be conceptually thought of as lying 'above' transport plane 32 which comprises the Ethernet switches 22*a*, 22*b*, 24*a*, 24*b*, 26 and 28 of carrier network 20. Connection controllers (CCs) are logical agents each corresponding to a respective Ethernet switch (which represent cross connects in ASTN terminology) in transport plane 32. Each CC controls the switching of its respective switch using Connection Control Interface (CCI) signalling (shown as dotted lines in FIG. 2). CCI signalling is used to directly configure the forwarding tables used by Ethernet switches 22*a*, 22*b*, 24*a*, 24*b*, 26 and 28 of carrier network 20. CCs may communicate between themselves using a Network to Network Interface (NNI). Typically, CCs will exchange information regarding their operational state and the state, in particular the capacity, of their communications links using NNI signalling. Other control plane functions such as heartbeat, ping and circuit monitoring may be provided using the ITU-T standard-in-preparation currently referred to as Y.17ethOAM or the methods in IEEE standard 802.1ag.

While CCs 32*a*, 32*b*, 34*a* and 34*b* are logically separate from Ethernet switches 22*a*, 22*b*, 24*a* and 24*b* the reader will understand that they may be implemented in the same physical nodes in a distributed control plane model. Additionally, one CC may control one or more Ethernet switches which is moving towards a more centralised control plane model. Furthermore, NNI signalling may take place over the same communications links used for transporting user traffic.

FIG. 2 shows how control plane 30 interacts with transport plane 32 to establish a point-to-point connection across carrier network 20. Typically, the connection will be bi-directional, although this can simply be considered as the combination of two uni-directional point to point connections. A request to establish a connection specifying a required bandwidth and an explicit route across carrier network 20 is generated for example by a supervisory network management node (not shown) or distributed network management system or function. The explicit route will have been determined in accordance with a conventional routing protocol taking into account the topology of the carrier network, the operational state of network resources and the bandwidth requirements of existing and possible future connections. The route to be taken by the exemplary connection shown in FIG. 2 spans Ethernet switches 22*a*, 24*a*, 24*b* and 22*b* over communications links 48. Since the connections share many qualities with SONET/SDH trails, management systems already developed for SONET/SDH trail management may be re-used for managing connections in the present invention—for example Nortel's Optical Network Manager. This has the advantage that carrier networks already using SONET/SDH trail management systems need not invest in new management systems when deploying the network arrangements proposed in the present invention. The route may also be established by direct NNI signalling between CCs in an ad-hoc fashion. The request to establish a connection is first sent to CC 32*a*. On receipt of the request, CC 32*a* checks whether the communications link between switches 22*a* and 24*a* has sufficient capacity to support the required bandwidth. If so, it forwards a connection setup request message 50 to CC 34*a* specifying the required bandwidth and explicit route. CC 34*a* then checks whether the communications link between switches 24*a* and 24*b* has sufficient capacity to support the required bandwidth. The process continues until the connection setup message request 50 reaches CC 32*b*. Along the route, CCs may optionally reserve bandwidth of their respective switches and communication links so as to avoid race conditions where competing connections are setup over the same resources. When connection setup request message 50 reaches CC 32*b*, if there is sufficient bandwidth along the entire path to support the required connection, then CC 32*b* sends a connection setup response message 52 back to CC 34*b*, CC 34*a* and finally to CC 32*a*. As the connection setup response message 52 traverses the CCs, each CC sends CCI signalling 54 to its respective switch to configure the forwarding tables of each switch, thereby to establish the forwarding state required to setup the connection.

It will be appreciated that the mechanism for establishing connections across carrier network 20 described above is merely exemplary and other well-known mechanisms may be used. For example, all the admission control may be performed in a centralised CC controlling several if not all the Ethernet switches in the extreme. In another example arrangement, the supervisory management function may be used to compute routes for connections and simultaneously perform the necessary admission control; this in turn would simplify the role performed by the CC. Yet another example is where the supervisory management function or CC consults a specialised and either centralised or distributed Bandwidth Manager or Policy Decision Function to perform the admission control.

Typically, there will be many thousands or tens of thousands of connections established across a carrier network at any time. These connections will share the physical resources of the carrier network—i.e. the switches and communications links. Thus, each switch will typically have a large number of connections established through it at any point in time. However, each switch must be able to forward data traffic according to the explicit route requirements of the specific connection through which that traffic is being sent. A likely scenario is that the carrier network will need to establish multiple connections from the same source nodes, multiple connections to the same destination nodes and multiple connections both from the same source nodes and to the same destination nodes. However, for traffic engineering purposes, the latter connections may need to be established through physically distinct routes across the network. Furthermore, these routes may need to converge and diverge again within the carrier network. To support such route flexibility in connections, what is required is that each switch be able to differentiate between data traffic travelling in different connections and forward accordingly. A conventional switched Ethernet is incapable of differentiating between flows in this way since conventional Ethernet switches forward traffic based solely on a forwarding table (established through auto learning) mapping destination address to output port. As a result, a conventional Ethernet switch will not be able to differentiate between data traffic having the same destination address, although it may be associated with multiple different connections.

There are various ways in which an Ethernet switch can be configured to recognise traffic belonging to certain intended paths across the network. A preferred way, described in unpublished Patent Application PCT/GB2005/001332, filed 6 Apr. 2005, the contents of which are incorporated herein, is to use a combination of the destination address and VLAN tag carried within a frame. VLAN tags are defined in IEEE 802.1Q and are usually intended to identify a LAN to which the traffic belongs. Here, VLAN tags are used in a different manner, and traffic which is intended to follow a particular path across the Ethernet network 20 is allocated a unique combination of VLAN tag and destination address. Each Ethernet switch stores separate forwarding tables for each VLAN tag configured, the VLAN tag acting as a mapping (or indexing) to forwarding tables, and each forwarding table mapping destination address to output port. The group of forwarding tables at each switch provide a mapping from a combination of destination address and VLAN tag to output port.

According to the preferred embodiment, VLAN tags have meaning only within the context of a destination address. As such, the allocation of VLAN tags is logically localised to the node owning the destination address, herein called the destination node. Thus, at the point where a new connection is requested, its destination node will allocate to that connection a VLAN tag to use in combination with a destination address corresponding to that node. This VLAN tag will be allocated such that no existing connection to the destination address whose route crosses with & subsequently diverges from the new connection shall share a VLAN tag. This is such that where differential forwarding is required (at the divergence point), the destination address/VLAN tag pair of the diverging connections are distinct. Additional constraints can be placed on the allocation as described elsewhere to improve pathological behaviour in case of inadvertent partial route removal in a network where broadcast-on-unknown is not fully disabled on all VLAN tags used for connections.

Figure 3:
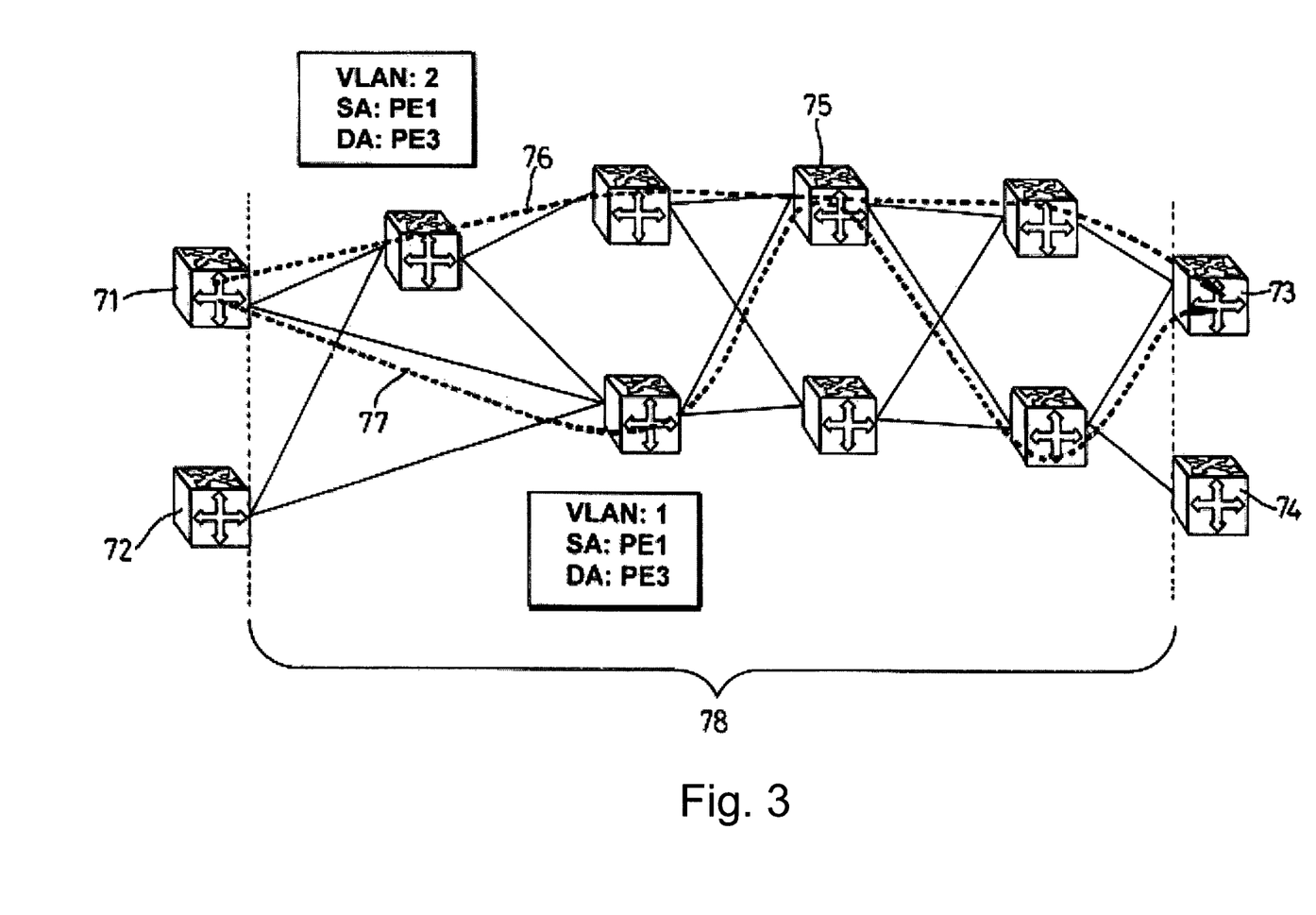
FIG. 3 shows the use of differential forwarding for two traffic flows across a network.

FIG. 3 shows a way in which this behaviour can be used to route traffic within a network. Connections 76 and 77 have both the same source address (edge Ethernet switch 71-PE1) and destination address (edge Ethernet switch 73-PE3). However, the routes that connections 76 and 77 traverse are different. In particular, it can be seen that at core Ethernet switch 75, connections 76 and 77 converge and then immediately diverge. Despite the common destination address, core Ethernet switch 75 is able to differentiate frames belonging to connection 76 from frames belonging to connection 77 (and to forward them accordingly) on the basis of their different VLAN tags. Thus, data traffic in connection 76 has the VLAN tag 2, for example, whereas data traffic in connection 77 has the VLAN tag 1. Differentiation between Ethernet frames belonging to different connections is achieved according to the combination of destination address and VLAN tag. A difference in either may be used to achieve differential forwarding required for connections.

Figure 4:
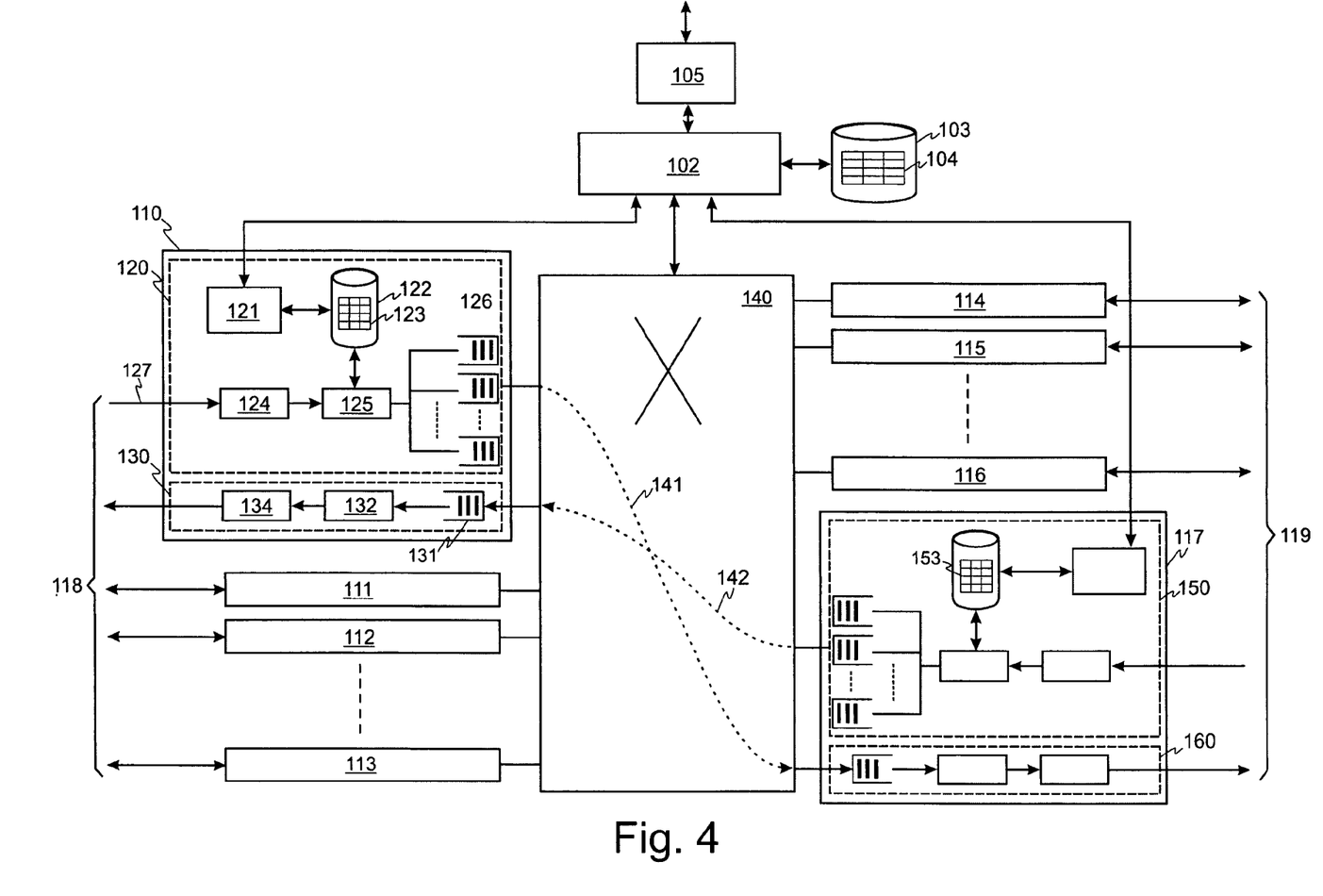
FIG. 4 shows one of the Ethernet switches used in the network of FIGS. 1 and 2.

FIG. 4 schematically shows an Ethernet switch 100 according to an embodiment of the invention. The switch 100 has a set of ports 110-117 which are interconnected by a switch fabric 140. One such port 110 is shown in detail and each port has the same structure. Ethernet ports are bi-directional and comprise an ingress section 120 and an egress section 130 which share a common MAC address. The ingress section 120 has a line interface 124 which connects to a communication link 127. The line interface converts the incoming signal from a format used on the line 127 to a baseband electrical digital signal which can be used by the following stages. Typically, this involves receiving, and demodulating, an optical signal and decoding the demodulated signal from a line code used for transmission. For each frame, stage 125 determines a destination port of the switch that the frame should be sent to by examining fields within the frame and a priority for that frame. In the preferred scheme just described, this requires stage 125 to inspect the destination address field and the VLAN tag field of the frame. A look-up table 123 is stored in a memory 122 local to the port. Stage 125 performs a look-up operation using the destination address and VLAN tag to identify the port that the frame should be sent to. Stage 125 sends the frame to the appropriate buffer 126 where the frame is queued before the switch fabric transfers the frame to the required destination port. Typically, a switch will transfer fixed sized blocks of data across the switch fabric (e.g. cells 80 bytes in length) to maximise efficiency of the switch and to minimise blocking between switch ports, but this is not important to the invention and the switch can use any technology for the switch fabric. At the egress section of the destination port the blocks are reassembled in a buffer 131 before being sent to a line interface 134. Typically, this will involve encoding the data frame with a line code and modulating the electrical digital signal onto an optical carrier.

Each port is associated with a port controller 121 which is responsible for maintaining the forwarding table 123 at that port. Port controller 121 communicates with a switch controller 102. Port controller 121 is essentially a 'housekeeping' processor which performs tasks locally at the port, in response to instructions received from switch controller 102. Switch controller 102 maintains a master forwarding table 104 in storage 103 local to the controller 102 and communicates via a signalling interface 105 to a connection controller. As connections across network 20 are set-up, changed (e.g. due to traffic management operations) or torn down, switch controller 102 receives instructions to add or remove entries in the forwarding table 104 from a network connection controller. The information received at switch controller 102 from a Network Management System will typically refer to a physical address and will set up a bi-directional path (i.e. forward and return paths) at the same time {i.e. forward frames with destination MAC_address1 and VLAN1 arriving at port X to port Y; forward return-path frames with destination MAC_address2 and VLAN2 arriving at port Y to port X}. Alternatively, the switch controller 102 may receive information in the form of a more symbolic address which is resolved to a physical address at switch 100 (e.g. to determine the exact ports involved in the connection). For each change to table 104, switch controller 102 determines which port is affected by the change and then instructs the port controller responsible for that port of the change. Port controller 121 then updates the forwarding table 123 held locally at the port. It can be seen that because each port only maintains a forwarding table of connections involving that port, the size of the local table is much smaller than would otherwise be needed. This allows the port to have a smaller memory, which reduces cost of each port. The association between a port controller 121/memory 122 and a port can be 1:1 (i.e. one port controller 121 and memory 122 for each bi-directional port, which allows high-speed access to forwarding table 123 held within memory 122) or it can be 1:N where N is the set of ports on a port card or a sub-set of the ports.

As an example of the type of forwarding table held at each port, the following represents part of the forwarding table 123 held at port 110:

| Destination Address | VLAN tag | Destination port |
|---|---|---|
| Node 22b | 1 | Port 117 |
| Node 22b | 2 | Port 114 |
| Node 22c | 1 | Port 115 |
| Node 22c | 3 | Port 116 | where the 'Destination Address' field would include the Ethernet address corresponding to Node 22b or Node 22c. In this example, a frame arriving at port 110 with a destination address field set to 'Node 22b' and a VLAN tag=1 would be routed to destination port 117 of the switch, as shown by path 141 of FIG. 4. Because a connection controller controls a path across network 20, it is known which switches each traffic flow will pass through, and at which port the traffic flow will arrive and leave. Although each entry in the above forwarding table lists only one destination port, it is possible to forward data frames to multiple destination ports. Table 123 does not need to store forwarding information for any traffic flows which do not arrive at port 110. Traffic will often involve a reverse flow, which is shown as path 142 across switch fabric 140. Frames arriving at ingress section 150 of port 117 will be routed to the egress section 130 of port 110 using look-up table 153. In the case where traffic flows merge at switch, the same forwarding information will be stored in forwarding tables 123 associated with multiple of the ingress ports 120.

In the embodiment described above each port has a port controller 121. However, it is not essential that a port controller is provided for each port. Where a switch provides multiple physical ports per peripheral card, each card can have a port/card controller—essentially a 'housekeeping' processor—which talks to the hardware and communicates with the switch controller. The switch controller can specify exactly which port is to be updated by the port/card controller.

Figure 5:
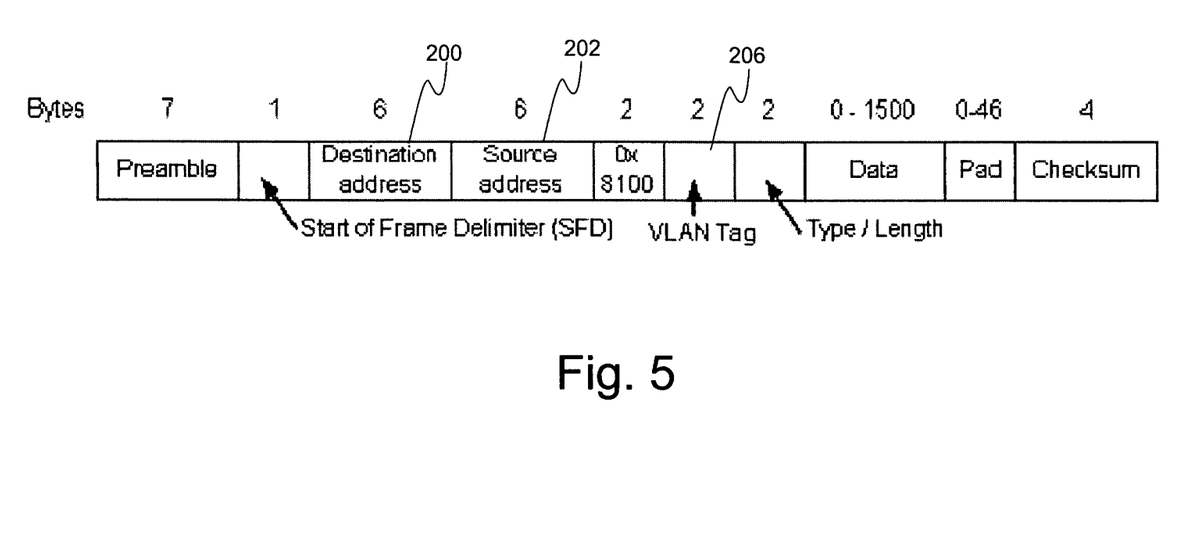
FIG. 5 shows the format of an Ethernet frame with VLAN tagging.

For completeness, FIG. 5 shows the format of an Ethernet frame and the position of the destination address field 200 (6 bytes), source address field 202 (6 bytes) and VLAN tag field 204 (2 bytes).

The invention is not limited to the embodiments described herein, which may be modified or varied without departing from the scope of the invention.

We claim:

1. An Ethernet switch for use in an Ethernet network, the switch comprising:
    a set of ingress ports for receiving data frames;
    a set of egress ports;
    a storage to store master forwarding information;
    a switch fabric for selectively interconnecting the ingress and egress ports;
    a respective local memory associated with each ingress port, each local memory storing local Ethernet forwarding information for Ethernet forwarding decisions, the local Ethernet forwarding information, for at least one Ethernet connection established in the Ethernet network using a control or management plane of the Ethernet network, comprising a destination MAC address and a Virtual Local Area Network (VLAN) tag as index values which, in combination, identify one or more of the egress ports to which data frames received by the respective ingress port should be forwarded;
    a control or management interface for receiving information about the established Ethernet connection through the switch; and
    a switch controller configured to cause local Ethernet forwarding information to be stored in the local memory associated with a first of the ingress ports which the established Ethernet connection will use, on the basis of the received information about the established Ethernet connection, and not to be stored in the local memory associated with a second of the ingress ports which the established Ethernet connection will not use,
    wherein the switch controller is configured to further maintain the master forwarding information that contains the local Ethernet forwarding information in the corresponding local memories.

2. An Ethernet switch according to claim 1 wherein the switch controller is configured to cause local Ethernet forwarding information to be stored only in the local memory associated with the first ingress port which the network established Ethernet connection will use, on the basis of the received information about the network connection.

3. An Ethernet switch according to claim 1 wherein the local Ethernet forwarding information stored in each local memory further comprises an Multi-Protocol Label Switching (MPLS) label or part thereof.

4. An Ethernet switch according to claim 1 wherein each ingress port has a port controller and the port controller is configured to receive Ethernet forwarding information and to update the corresponding local Ethernet forwarding information in the local memory associated with that ingress port based on the received Ethernet forwarding information.

5. An Ethernet switch according to claim 1, wherein a combination of a first VLAN tag and a first destination MAC address in the local memory of the first ingress port identifies the network established Ethernet connection, wherein a combination of a second VLAN tag and the first destination MAC address in the local memory of the first ingress port identifies another network connection.

6. An Ethernet switch according to claim 1, wherein the switch controller is configured to receive an instruction to update the master Ethernet forwarding information, and in response to the update of the master Ethernet forwarding information, the switch controller is configured to identify which one or more of the ingress ports is affected by the update and to cause corresponding local Ethernet forwarding information of the identified one or more ingress ports to be updated according to the update of the master Ethernet forwarding information.

7. An Ethernet switch according to claim 1, wherein the local Ethernet forwarding information stored in the local memory associated with the first ingress port is a subset less than all of the master Ethernet forwarding information.

8. An Ethernet network comprising a plurality of Ethernet switches, each Ethernet switch comprising:
  a set of ingress ports for receiving data frames;
  a set of egress ports;
  a storage to store master forwarding information;
  a switch fabric for selectively interconnecting the ingress and egress ports;
  a respective local memory associated with each ingress port, each local memory storing local Ethernet forwarding information for Ethernet forwarding decisions, the local Ethernet forwarding information, for at least one Ethernet connection established in the Ethernet network using a control or management pane of the Ethernet network, comprising a destination MAC address and a Virtual Local Area Network (VLAN) tag as index values which, in combination, identify one or more of the egress ports to which data frames received by the respective ingress port should be forwarded;
  a control or management interface for receiving information about a the established Ethernet connection through the switch; and
  a switch controller configured to cause local Ethernet forwarding information to be stored in the local memory associated with a first of the ingress ports which the established Ethernet connection will use, on the basis of the received information about the established Ethernet connection, and not to be stored in the local memory associated with a second of the ingress ports which the established Ethernet connection will not use,
  wherein the switch controller is configured to further maintain the master Ethernet forwarding information that contains the local forwarding information in the corresponding local memories.

9. An Ethernet network according to claim 8, wherein the switch controller is configured to receive an instruction to update the master Ethernet forwarding information, and in response to the update of the master Ethernet forwarding information, the switch controller is configured to identify which one or more of the ingress ports is affected by the update and to cause corresponding local Ethernet forwarding information of the identified one or more ingress ports to be updated according to the update of the master Ethernet forwarding information.

10. An Ethernet switch for use in an Ethernet network, comprising:
  a set of ingress ports for receiving data frames;
  a set of egress ports;
  a switch controller configured to receive information about Ethernet connections across the network established in the Ethernet network using a control or management plane of the Ethernet network, and wherein the ingress ports each have a local memory for storing local Ethernet forwarding information indicating one or more of the egress ports to which data frames received by the respective ingress port should be forwarded;
  a storage to store master Ethernet forwarding information containing the local forwarding information in the corresponding local memories; and
  a port controller associated with a first of the ingress ports and configured to receive Ethernet forwarding information from the switch controller for a particular network established Ethernet connection using the first ingress port, the received forwarding information comprising a destination MAC address and a Virtual Local Area Network (VLAN) tag as index values which, in combination, identify one of the egress ports to which data frames received by the first ingress port should be forwarded, and the port controller is configured to update the local Ethernet forwarding information in the local memory for the first ingress port with the received Ethernet forwarding information, wherein the received Ethernet forwarding information is received by the port controller on the basis of whether the particular established Ethernet connection will use the first ingress port.

11. An Ethernet switch for use in an Ethernet network, comprising:
  a set of ingress ports for receiving data frames and a set of egress ports, each ingress port having a local memory associated with the respective ingress port for storing local forwarding information, the local forwarding information for at least one Ethernet connection established in the Ethernet network using a control or management plane of the Ethernet network, comprising a destination MAC address and a Virtual Local Area Network (VLAN) tag as index values which, in combination, identify one or more of the egress ports to which data frames received by the respective ingress port should be forwarded;
  a storage to store master Ethernet forwarding information that contains the local Ethernet forwarding information of the corresponding local memories; and
  a switch controller configured to:
    receive information about a network an Ethernet connection established, or to be established, through the switch;
    update the master Ethernet forwarding information based on the received Ethernet information;
    identify which one or more of the ingress ports is affected by the update; and
    cause the local Ethernet forwarding information stored in the local memory associated with each of the identified one or more ingress ports to be updated on the basis of the received information about the established Ethernet connection, wherein the local Ethernet forwarding information in the local memory associated with a particular one of the ingress ports which will not be used by the established Ethernet connection is not updated on the basis of the received information.

12. A method of managing forwarding information in an Ethernet switch, the switch comprising a set of ingress ports for receiving data frames, a set of egress ports, a local memory associated with each ingress port for storing local Ethernet forwarding information indicating one or more of the egress ports to which data frames received by that ingress port should be forwarded, and a storage to store master Ethernet forwarding information containing the local Ethernet forwarding information in the corresponding local memories, the method comprising:
 receiving, via a control or management interface, information about an Ethernet connection established, or to be established, through the switch using a control or management plane of the Ethernet network;
 updating the master Ethernet forwarding information based on the received information about the established Ethernet connection;
 identifying which one or more of the ingress ports is affected by the update; and
 causing the local Ethernet forwarding information stored in the local memory associated with each of the identified one or more ingress ports to be updated, on the basis of the received information about the established Ethernet connection, wherein the local Ethernet forwarding information in the local memory associated with a particular one of the ingress ports which the established Ethernet connection will not use is not updated on the basis of the received information, wherein the local Ethernet forwarding information for the established Ethernet connection in each local memory comprises a destination MAC address and a Virtual Local Area Network (VLAN) tag as index values which, in combination, identify one or more egress ports to which data frames received by the respective ingress port should be forwarded.

13. A non-transient machine-readable storage medium on which is stored instructions for causing a processor at an Ethernet switch to perform a method of managing forwarding information in the switch, the switch comprising a set of ingress ports for receiving data frames, a set of egress ports, a local memory associated with each ingress port for storing Ethernet forwarding information indicating one or more of the egress ports to which data frames received by that ingress port should be forwarded, and a storage to store master Ethernet forwarding information including the local Ethernet forwarding information in the corresponding local memories, the method comprising:
 receiving, via a control or management interface, information about an Ethernet connection established, or to be established, through the switch using a control or management plane of the Ethernet network;
 updating the master Ethernet forwarding information based on the received information;
 identifying which one or more of the ingress ports is affected by the update; and
 causing the local Ethernet forwarding information stored in the local memory associated with each of the identified one or more ingress ports to be updated on the basis of the received information about the established Ethernet connection wherein the local Ethernet forwarding information in the local memory associated with a particular one of the ingress ports which the established Ethernet connection will not use is not updated on the basis of the received information, wherein the local Ethernet forwarding information for the established Ethernet connection in each local memory comprises a destination MAC address and a Virtual Local Area Network (VLAN) tag which, in combination, identify one or more egress ports to which data frames received by the respective ingress port should be forwarded.

* * * * *